(12) United States Patent
Katheder

(10) Patent No.: US 11,865,950 B2
(45) Date of Patent: Jan. 9, 2024

(54) SEAT CONTROL DEVICE AND VEHICLE SEAT HAVING SUCH A SEAT CONTROL DEVICE

(71) Applicant: Conti Temic microelectronic GmbH, Nuremberg (DE)

(72) Inventor: Gerhard Katheder, Alesheim (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 72 days.

(21) Appl. No.: 17/607,645

(22) PCT Filed: Jan. 22, 2020

(86) PCT No.: PCT/EP2020/051508
§ 371 (c)(1),
(2) Date: Oct. 29, 2021

(87) PCT Pub. No.: WO2020/221479
PCT Pub. Date: Nov. 5, 2020

(65) Prior Publication Data
US 2022/0203879 A1    Jun. 30, 2022

(30) Foreign Application Priority Data

Apr. 29, 2019   (DE) ..................... 10 2019 206 108.7

(51) Int. Cl.
*B60N 2/60*   (2006.01)
*B60N 2/90*   (2018.01)
(Continued)

(52) U.S. Cl.
CPC .......... *B60N 2/914* (2018.02); *B60N 2/0244* (2013.01); *B60N 2/02246* (2023.08); *B60N 2/665* (2015.04)

(58) Field of Classification Search
CPC ....... B60N 2/914; B60N 2/0244; B60N 2/665
See application file for complete search history.

(56) References Cited

U.S. PATENT DOCUMENTS 4,634,179 A * 1/1987 Hashimoto ............ A47C 7/467
297/284.6
4,655,505 A   4/1987 Kashiwamura et al.
(Continued)

FOREIGN PATENT DOCUMENTS

CN     206920875       1/2018
DE     3541537 A1      6/1986
(Continued)

OTHER PUBLICATIONS

Office Action dated Nov. 28, 2019 from corresponding German Patent Application No. DE 10 2019 206 108.7.
(Continued)

*Primary Examiner* — Syed A Islam

(57) ABSTRACT

A seat control device for a vehicle seat of a vehicle is disclosed. The seat control device comprises a first control element which controls an electric adjustment motor for electrically adjusting the vehicle seat and/or an electric heating device for electrically heating the vehicle seat, a fluid valve which controls a fluid flow for the pneumatic adjustment of the vehicle seat, a second control element which controls an operating state of the fluid valve, and a fluid pump which is fluidically connected to the fluid valve, wherein the first control element, the second control element, the fluid valve and the fluid pump are arranged on a common circuit board.

20 Claims, 2 Drawing Sheets

Figure 1:
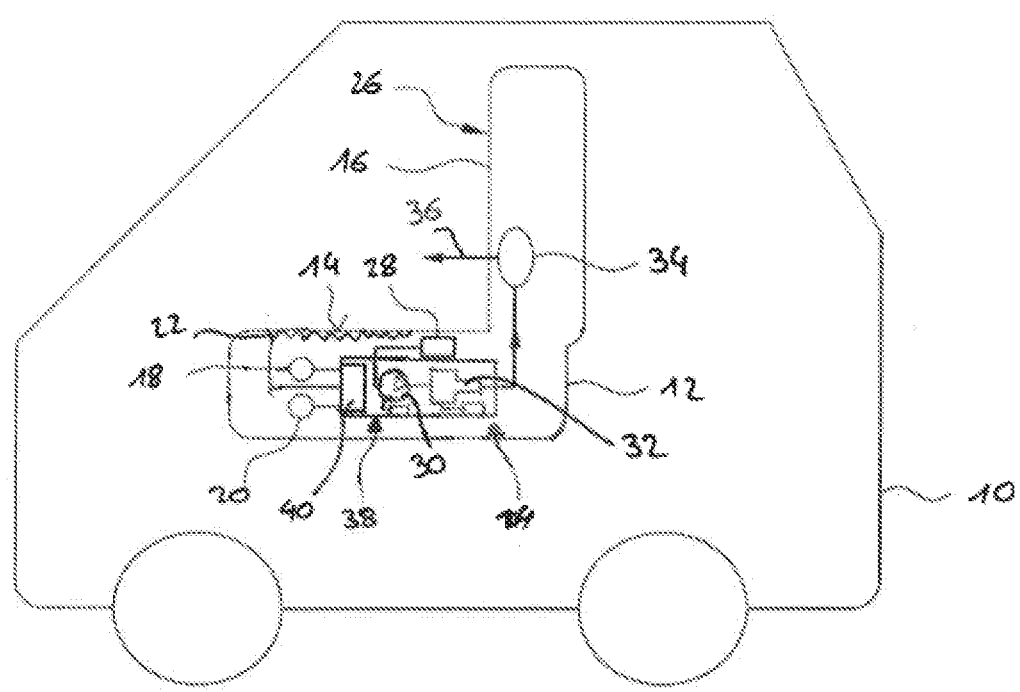

(51) Int. Cl.
*B60N 2/02* (2006.01)
*B60N 2/66* (2006.01)

(56) References Cited

U.S. PATENT DOCUMENTS

| | | | |
|---|---|---|---|
| 4,695,682 A * | 9/1987 | Winogrocki | H01H 13/84 200/6 R |
| 5,128,500 A * | 7/1992 | Hirschfeld | H01H 13/84 361/752 |
| 5,176,424 A * | 1/1993 | Tobita | A47C 4/54 297/452.52 |
| 5,475,592 A * | 12/1995 | Wnuk | B60N 2/0228 361/728 |
| 5,662,384 A | 9/1997 | O'Neill et al. | |
| 6,273,810 B1 * | 8/2001 | Rhodes, Jr. | A47C 27/083 297/452.47 |
| 6,339,302 B1 | 1/2002 | Greenbank et al. | |
| 6,422,087 B1 * | 7/2002 | Potter | B60N 2/665 73/731 |
| 6,894,234 B1 * | 5/2005 | Sottong | H01H 25/008 200/17 R |
| 8,162,398 B2 * | 4/2012 | Colja | A61H 9/0078 297/284.6 |
| 10,245,976 B2 * | 4/2019 | Hotary | B60N 2/0228 |
| 10,948,098 B2 * | 3/2021 | Pfahler | F16K 31/002 |
| 2008/0009989 A1 * | 1/2008 | Kim | B60N 2/0224 701/36 |
| 2010/0193340 A1 * | 8/2010 | Ujimoto | B60N 2/0228 200/339 |
| 2014/0232155 A1 * | 8/2014 | Bocsanyi | B60N 2/914 297/284.6 |
| 2016/0280097 A1 | 9/2016 | Hotary et al. | |
| 2018/0038514 A1 * | 2/2018 | Kuszneruk | F16K 99/0044 |
| 2018/0118055 A1 * | 5/2018 | Schlosser | B60N 2/0244 |
| 2018/0208080 A1 * | 7/2018 | Hirayama | B60N 2/0224 |
| 2019/0263305 A1 * | 8/2019 | Schuetze | F04B 45/047 |
| 2019/0299831 A1 * | 10/2019 | Rosero | B60N 2/976 |
| 2021/0276458 A1 * | 9/2021 | Fujii | A61H 9/0078 |
| 2022/0305975 A1 * | 9/2022 | Zhang | B60N 2/99 |

FOREIGN PATENT DOCUMENTS

| | | |
|---|---|---|
| DE | 3804959 A1 | 8/1989 |
| DE | 102005045403 A1 | 4/2007 |
| DE | 102009031331 A1 | 8/2010 |
| DE | 102014219343 A1 | 9/2015 |
| DE | 102017214313 A1 | 2/2019 |
| EP | 1447070 A1 | 8/2004 |
| FR | 2988344 B1 | 4/2018 |
| JP | S61257333 A | 11/1986 |
| KR | 20100000550 A | 1/2010 |
| WO | 2006087134 A1 | 8/2006 |
| WO | 2009146590 A1 | 12/2009 |
| WO | 2018046486 A1 | 3/2018 |

OTHER PUBLICATIONS

International Search Report and Written Opinion dated May 7, 2020 from corresponding International Patent Application No. PCT/EP2020/051508.

Office Action dated Feb. 3, 2023 from corresponding Chinese patent application No. 202080032485.6.

Notice of Allowance dated Aug. 7, 2023 from corresponding Chinese patent application No. 202080032485.6.

* cited by examiner

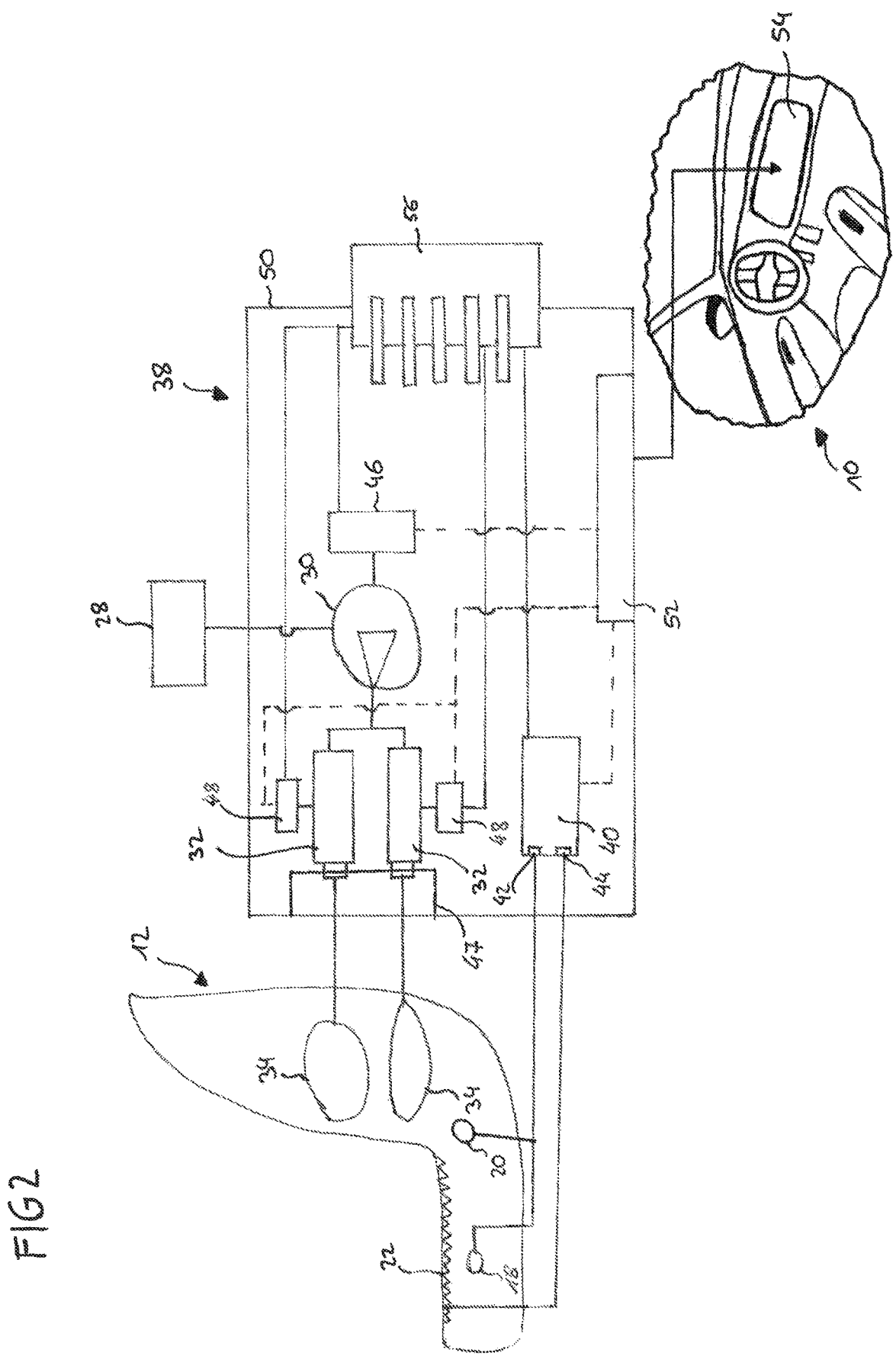

SEAT CONTROL DEVICE AND VEHICLE SEAT HAVING SUCH A SEAT CONTROL DEVICE

The present invention relates to a seat control device for a vehicle seat of a vehicle. The present invention also relates to a vehicle seat having such a seat control device.

Modern vehicle seats have a motorized seat adjuster with which, for example, a seat back and/or a seat surface of the vehicle seat can be adjusted. Modern vehicle seats often also have an electric seat heater with which the seat back and/or the seat surface of the vehicle seat can be electrically heated. In addition, modern vehicle seats can also have a pneumatic adjustment device. By means of the pneumatic adjustment device, bladders which can be filled with fluid, in particular compressed air, can be used as adjusting elements for adjusting a seat contact surface of the vehicle seat in the area of the seat surface and/or seat back. In this way, for example, a lumbar support in the area of the lumbar vertebrae and/or a massage effect of the seat contact surface can be created.

However, in modern vehicle seats it is usually the case that the various configurations of the vehicle seat have their own control devices. Thus, a modern vehicle seat now has, for example, a first control device for motorized adjustment, a second control device for electrical heating and a third control device for pneumatic adjustment of the vehicle seat. Each of the control devices requires installation space, which is usually limited in modern vehicle seats. The control device for the pneumatic adjustment device is also often not integrated into the vehicle electronics, so that convenient operation of the pneumatic adjustment device, as is known for motorized adjustment and/or electrical heating, is often not possible. Instead, additional rocker switches or cross-type rocker switches are used to actuate the pneumatic adjustment device.

It is therefore an object of the present invention to provide a single seat control device in which the functionality for both pneumatic adjustment and electrical and/or thermal adjustment of the vehicle seat is integrated. It is also an object of the present invention to provide a vehicle seat having such a seat control device.

These objects are achieved with a seat control device as claimed in patent claim 1 and a vehicle seat as claimed in patent claim 5. Preferred and advantageous embodiments of the invention are specified in the dependent claims.

According to a first aspect of the invention, a seat control device for a vehicle seat of a vehicle is created. The seat control device comprises a first control element which controls an electric adjustment motor for electrically adjusting the vehicle seat and/or an electric heating device for electrically heating the vehicle seat. The seat control device further comprises a fluid valve which controls a fluid flow for the pneumatic adjustment of the vehicle seat, and a second control element which controls an operating state of the fluid valve. The seat control device further comprises a fluid pump which is fluidically connected to the fluid valve. In the seat control device according to the invention, the first control element, the second control element, the fluid valve and the fluid pump are also arranged on a common circuit board. The common circuit board here is a common carrier board, which serves both as a mechanical fastening platform and as an electrical connection for the first control element, the second control element, the fluid valve and the fluid pump. By arranging the first control element, the second control element, the fluid valve and the fluid pump on a common circuit board, a compact seat control device can be created in which not only the electrical adjustment and/or electrical heating of the vehicle seat but also the pneumatic adjustment of the vehicle seat are made possible by means of a single control device. In addition, by integrating the fluid pump (fluid compressor) on the common circuit board, disproportionately long hose and/or electrical connecting lines to the fluid pump can be dispensed with, since the fluid pump is arranged in a space-saving manner on the common circuit board together with the remaining components.

According to a preferred embodiment, the seat control device further comprises a third control element which controls an operating state of the fluid pump and, together with the first control valve, the second control valve, the fluid valve and the fluid pump, is arranged on the common circuit board. In this particularly preferred embodiment, the third control element for controlling the fluid pump is also integrated into the seat control device. This makes the seat control device even more compact.

According to a further embodiment, the seat control device according to the invention further comprises a pneumatic connection section which is arranged on the common circuit board, is fluidically connected to the fluid valve and is designed to connect a fluid bladder or a pneumatic adjusting element to the fluid valve. In this embodiment, the seat control device thus has a specially designed connection section for the fluid bladders. As a result, the fluid bladders can be connected to the seat control device without problems, without the need to connect additional components for the pneumatic adjustment to the seat control device. The fluid bladders can be connected to the pneumatic connection section and thus to the seat control device either directly or via hose connections. This creates a compact and integrated module in which, apart from the fluid bladders required for the pneumatic adjustment (and possibly their hose connections), all the necessary components are integrated in a single seat control device.

According to a further embodiment, the seat control device according to the invention further comprises an electrical connection section which is arranged on the common circuit board and is electrically connected to the first control element, the second control element and, if appropriate, the third control element. The electrical connection section is designed to electrically connect the seat control device to an operating module (for example an HMI) of the vehicle. As a result, not only the electrical adjustment and/or electrical heating of the vehicle seat, but also the pneumatic adjustment of the vehicle seat, can be set easily and conveniently via a single operating module of the vehicle. In this particularly preferred embodiment, the previously mentioned rocker switch or cross-type rocker switch can therefore be omitted, since the pneumatic adjustment now—like the rest of the seat adjustment—takes place conveniently via the operating module of the vehicle.

According to a second aspect of the present invention, a vehicle seat having a seat control device according to the first aspect or configurations thereof is provided. The vehicle seat according to the invention is particularly compact, since it has the particularly compact seat control device according to the first aspect or configurations thereof.

Further features and objects of the present invention will become apparent to a person skilled in the art by practicing the present teaching and taking into consideration the accompanying drawings. In the drawings:

FIG. 1 shows a schematic view of a vehicle having a vehicle seat which has a seat control device according to the invention, and FIG. 2 shows a schematic view of a seat control device according to the invention.

Elements of identical design or function are provided with the same reference signs across all figures.

Reference will first be made to FIG. 1, which shows a schematic view of a vehicle 10 having a vehicle seat 12. The vehicle 10 can be any vehicle, for example a motor vehicle.

The vehicle seat 12 has a seat surface 14 and a seat back 16. The vehicle seat 12 has electric adjustment motors (servomotors) 18, 20 which enable the vehicle seat 12 to be adjusted electrically. For example, the electric adjustment motor 18 moves the seat surface 14 along a first axis and the electric adjustment motor 20 tilts the seat back 16 about a second axis.

The vehicle seat 12 also has an electric heating device 22 which enables the vehicle seat 12 to be electrically heated. As an example, the electric heating device 22 is arranged in the area of the seat surface 14 in FIG. 1. However, in other embodiments, it can also be arranged in other areas of the vehicle seat.

The vehicle seat 12 also has a pneumatic adjustment device 24. With the pneumatic adjustment device 24, a seat contact surface 26 of the vehicle seat 12 can be adjusted pneumatically. For this purpose, the pneumatic adjustment device 24 has a fluid source 28, a fluid pump 30 fluidically connected to the fluid source 28, a fluid valve 32 fluidically connected to the fluid pump 30, and a fluid bladder 34 connected to the fluid valve 32. The fluid pump 30 puts the fluid (for example air) made available by the fluid source 28 under pressure. The fluid valve 32 controls a fluid flow provided by the fluid pump 30. The fluid flow fills or empties the fluid bladder 34, as a result of which the seat contact surface 26 is moved or pneumatically adjusted. When the fluid bladder 34 is filled with fluid, the fluid bladder 34 expands, for example, in such a way that the seat contact surface 26 is moved in the direction of the arrow 36.

The vehicle seat 12 also has a seat control device (control device) 38. On the seat control device 38, among other things, the fluid pump 30, the fluid valve 32 and control elements for controlling the fluid pump 30 and the fluid valve 32 are arranged. The control device 38 also has a control element 40 which controls the electric heating device 22 and the electric adjustment motors 18, 20.

Reference will now be made to FIG. 2, which shows a schematic view of the seat control device 38 from FIG. 1.

The seat control device 38 has a control element 40 which controls the electric adjustment motors 18, 20 electrically. For this purpose, the control element 40 has a first control output 42 which is designed to generate a first electrical control signal for controlling the electric adjustment motors 18, 20. The control element 40 also has a second control output 44 which is designed to generate a second electrical control signal for controlling the electric heating device 22. In the specific example of FIG. 2, the control element 40 can control both the electric adjustment motors 18, 20 and the electric heating device 22 electrically. Of course, it is also possible for the control element 40 to consist of two separate control elements, one of which controls the electric adjustment motors 18, 20 and the other controls the electric heating device 22. It is also possible for each electric adjustment motor 18, 20 to be controlled by its own control element.

The seat control device 38 also has the fluid pump 30, which in turn is fluidically connected to the fluid source 28. The seat control device 38 also has a control element 46 which controls an operating state of the fluid pump 30 so as, for example, to control a pressure and/or a throughput through the fluid pump 30.

The seat control device 38 also has two fluid valves 32 which are each fluidically connected to the fluid pump 30. Of course, in other embodiments, the seat control device 38 can have a different number of fluid valves 32, for example a single fluid valve 32 or at least three fluid valves 32.

Each of the fluid valves 32 is fluidically connected to a respective fluid bladder 34. For this purpose, the seat control device has a specially designed pneumatic connection section 47 which allows a fluidic connection between the fluid bladders 34 and the fluid valves 32. As a result, the fluid bladders 32 can be connected to the fluid valves 32 either directly or by means of hose connections. The fluid bladder 34 can be a single-chamber or a multi-chamber bladder. In the case of a multi-chamber bladder, it is conceivable that a first chamber is filled/emptied by a first fluid valve 32 and a second chamber is filled/emptied by a second fluid valve 32. However, it is also possible for a single fluid valve 32 to fill/empty all (or at least a plurality of) chambers of the multi-chamber bladder.

The seat control device 38 also has two control elements 48 which are each connected to a respective fluid valve 32. The respective control element 48 controls an operating state of a respective fluid valve 32, so that a respective fluid flow can flow between the respective fluid bladder 34 and the respective fluid valve 32. Although, in the specific example of FIG. 2, each of the fluid valves 32 is controlled by a single control element 48, it is of course also possible for a single control element 48 to control all of the fluid valves 32.

Both the control element 40, which controls the electric adjustment motors 18, 20 and the electric heating device 22, and the fluid pump 30 and the fluid valves 32 (together with their control elements 46, 48) are arranged on a common circuit board 50 of the seat control device 38. The common circuit board 50 serves as a carrier board for the mechanical fastening and electrical connection of the components 40, 46, 48, 30 and 32. By arranging the control elements 40, 46, 48, the fluid valves 32 and the fluid pump 30 on a single common circuit board 50, a particularly compact seat control device 38 is created which allows not only electrical adjustment and/or electrical heating but also pneumatic adjustment of the vehicle seat 12.

The seat control device 38 also has an electrical connection section 52 which is electrically connected to the control elements 40, 46 and 48. The electrical connection section 52 is designed to connect the seat control device 38 to an operating module 54 such as, for example, an HMI (Human Machine Interface) of the vehicle 10. Thus, a vehicle occupant can, for example, carry out not only the electrical adjustment and/or electrical heating but also the pneumatic adjustment of the vehicle seat 12 by means of a single operating module 54.

The seat control device 38 also has a plug section 56 which allows the seat control device 38 to be electrically connected to an electrical energy supply of the vehicle 10.

The invention claimed is:

1. A seat control device for a vehicle seat of a vehicle, comprising:
    a first control element which controls at least one of an electric adjustment motor configured to electrically adjust the vehicle seat and an electric heating device configured to electrically heat the vehicle seat,
    a fluid valve which controls a fluid flow in the pneumatic adjustment of the vehicle seat,
    a second control element which controls an operating state of the fluid valve, and
    a fluid pump which is fluidically connected to the fluid valve, wherein the first control element, the second control element, the fluid valve and the fluid pump are arranged on a common circuit board.

2. The seat control device as claimed in claim 1, wherein the seat control device further comprises a third control element which controls an operating state of the fluid pump and, together with the first control element, the second control element, the fluid valve and the fluid pump, is arranged on the common circuit board.

3. The seat control device as claimed in claim 1, wherein the seat control device further comprises a pneumatic connection section which is arranged on the common circuit board, is fluidically connected to the fluid valve and is configured to connect a fluid bladder to the fluid valve.

4. The seat control device as claimed in claim 1, wherein the seat control device further comprises an electrical connection section which is arranged on the common circuit board, is electrically connected to the first control element and the second control element, and is configured to be connected to an operating module of the vehicle.

5. The vehicle seat having the seat control device as claimed in claim 1.

6. The seat control device as claimed in claim 4 wherein the electrical connection section is electrically connected to the third control element.

7. The seat control device as claimed in claim 2 wherein the seat control device further comprises a pneumatic connection section which is arranged on the common circuit board, is fluidically connected to the fluid valve and is configured to connect a fluid bladder to the fluid valve, and
wherein the seat control device further comprises an electrical connection section which is arranged on the common circuit board, is electrically connected to the first control element, the second control element and the third control element, and is configured to be connected to an operating module of the vehicle.

8. The vehicle seat having the seat control device as claimed in claim 7.

9. The vehicle seat having the seat control device as claimed in claim 2.

10. The seat control device as claimed in claim 2, wherein the seat control device further comprises a pneumatic connection section which is arranged on the common circuit board, is fluidically connected to the fluid valve and is configured to connect a fluid bladder to the fluid valve.

11. The vehicle seat having the seat control device as claimed in claim 10.

12. The seat control device as claimed in claim 10, wherein the seat control device further comprises an electrical connection section which is arranged on the common circuit board, is electrically connected to the first control element and the second control element, and is configured to be connected to an operating module of the vehicle.

13. The vehicle seat having the seat control device as claimed in claim 12.

14. The seat control device as claimed in claim 12 wherein the electrical connection section is electrically connected to the third control element.

15. The vehicle seat having the seat control device as claimed in claim 14.

16. The seat control device as claimed in claim 2, wherein the seat control device further comprises an electrical connection section which is arranged on the common circuit board, is electrically connected to the first control element and the second control element, and is configured to be connected to an operating module of the vehicle.

17. The vehicle seat having the seat control device as claimed in claim 16.

18. The seat control device as claimed in claim 3, wherein the seat control device further comprises an electrical connection section which is arranged on the common circuit board, is electrically connected to the first control element and the second control element, and is configured to be connected to an operating module of the vehicle.

19. The vehicle seat having the seat control device as claimed in claim 18.

20. The seat control device as claimed in claim 19 wherein the electrical connection section is electrically connected to the third control element.

* * * * *